United States Patent
Johnson et al.

(10) Patent No.: US 11,980,113 B2
(45) Date of Patent: May 14, 2024

(54) SYSTEM AND METHOD FOR ADJUSTING ACTUATOR PRESSURE ON AN AGRICULTURAL IMPLEMENT USING A VALVE

(71) Applicant: CNH Industrial America LLC, New Holland, PA (US)

(72) Inventors: Chad M. Johnson, Arlington Heights, IL (US); Trevor Stanhope, Oak Lawn, IL (US); Christopher Joel Huber, Gurnee, IL (US); Michael Christopher Conboy, Chicago, IL (US)

(73) Assignee: CNH Industrial America LLC, New Holland, PA (US)

( * ) Notice: Subject to any disclaimer, the term of this patent is extended or adjusted under 35 U.S.C. 154(b) by 401 days.

(21) Appl. No.: 17/322,488

(22) Filed: May 17, 2021

(65) Prior Publication Data

US 2022/0361394 A1    Nov. 17, 2022

(51) Int. Cl.
*A01B 63/32* (2006.01)
*A01B 61/04* (2006.01)
(Continued)

(52) U.S. Cl.
CPC ............ *A01B 63/32* (2013.01); *A01B 61/046* (2013.01); *A01B 63/008* (2013.01); *A01B 79/005* (2013.01); *A01C 7/205* (2013.01)

(58) Field of Classification Search
CPC ..... A01B 79/005; A01B 63/008; A01B 63/32; A01B 63/10; A01B 63/114; A01B 63/24; A01B 61/046; A01C 5/062; A01C 7/205
See application file for complete search history.

(56) References Cited

U.S. PATENT DOCUMENTS 6,070,673 A * 6/2000 Wendte ................. G01C 21/20
 701/50
6,112,839 A * 9/2000 Ostler .................... B60K 25/00
 180/53.4
(Continued)

FOREIGN PATENT DOCUMENTS

WO    WO-0195698 A1 * 12/2001 ............ A01B 63/22
WO    WO 2020035443      2/2020

OTHER PUBLICATIONS

Deng et al., "Constant Pressure Control for Variable-Rate Spray Using Closed-Loop Proportion Integration Differentiation Regulation", Journal of Agricultural Engineering 2016, vol. XL VII:512, dated 2016 (9 pages) https://www.researchgate.net/publication/309401965_Constant_pressure_control_for_variable-rate_spray_using_closedloop_proportion_integration_differentiation_regulation/link/5alf6c230f7e 9b9d5e029817/download.
(Continued)

*Primary Examiner* — Adam J Behrens
*Assistant Examiner* — Blake E Scoville
(74) *Attorney, Agent, or Firm* — Rebecca L. Henkel; Rickard K. DeMille; Peter K. Zacharias

(57) ABSTRACT

A system for adjusting actuator pressure on an agricultural implement includes a fluid-driven actuator configured to adjust a position of a tool of the implement relative to the implement frame, with the fluid-driven actuator defining a fluid chamber. Furthermore, the system includes a valve configured to control a flow of a fluid to the fluid-driven actuator. In addition, the system includes a fluid conduit fluidly coupled between the valve and the fluid chamber. Moreover, the system includes a computing system is configured to determine the current position of the tool relative to the implement frame based on the data captured by a position sensor. Additionally, the computing system is configured to determine a current volume of the fluid chamber (Continued)

and the fluid conduit based on the determined current position. Furthermore, the computing system is configured to control the operation of the valve based on the determined current volume.

16 Claims, 6 Drawing Sheets

(51) Int. Cl.
*A01B 63/00* (2006.01)
*A01B 79/00* (2006.01)
*A01C 7/20* (2006.01)

(56) References Cited

U.S. PATENT DOCUMENTS

| | | | |
|---|---|---|---|
| 6,253,692 B1 * | 7/2001 | Wendling | A01C 7/006 111/139 |
| 8,365,762 B1 * | 2/2013 | Trotter | B64D 1/18 91/363 R |
| 8,485,148 B2 * | 7/2013 | Schiemann | F02D 41/20 123/90.12 |
| 8,550,020 B2 * | 10/2013 | Sauder | F15B 11/042 701/50 |
| 8,827,001 B2 * | 9/2014 | Wendte | A01B 63/145 172/4 |
| 9,226,442 B2 | 1/2016 | Grimm et al. | |
| 9,232,687 B2 * | 1/2016 | Bassett | A01C 7/203 |
| 9,435,458 B2 | 9/2016 | Needham et al. | |
| 9,635,848 B2 | 5/2017 | Needham et al. | |
| 9,782,711 B2 | 10/2017 | Barker | |
| 10,371,277 B2 | 8/2019 | Needham et al. | |
| 10,605,277 B2 | 3/2020 | Wang et al. | |
| 10,729,123 B2 | 8/2020 | Kolb et al. | |
| 10,743,460 B2 | 8/2020 | Gilbert et al. | |
| 2008/0230624 A1 | 9/2008 | Giles et al. | |
| 2012/0048160 A1 * | 3/2012 | Adams | A01C 5/066 111/163 |
| 2014/0196919 A1 * | 7/2014 | Kowalchuk | A01B 63/32 701/50 |
| 2014/0303854 A1 * | 10/2014 | Zielke | G01N 19/10 374/170 |
| 2015/0271986 A1 * | 10/2015 | Sauder | A01C 5/068 172/180 |
| 2015/0375247 A1 * | 12/2015 | Funseth | B05B 1/20 239/69 |
| 2017/0251587 A1 * | 9/2017 | Sporrer | A01B 15/14 |
| 2019/0246548 A1 * | 8/2019 | Kovach | A01B 3/24 |
| 2019/0343032 A1 * | 11/2019 | Stanhope | A01B 76/00 |
| 2019/0387659 A1 * | 12/2019 | Ferrari | A01B 79/005 |
| 2020/0037519 A1 * | 2/2020 | Wonderlich | B05B 9/06 |

OTHER PUBLICATIONS

Yildirim et al., "Laboratory Evaluation of an Electro-Pneumatic Sampling Method for Real-Time Soil Sensing", Iowa State University Digital Repository, Agricultural and Biosystems Engineering Publications, dated 2006 (8 pages) https://lib.dr.iastate.edu/cgi/viewcontent.cgi?article=1837&context=abe_eng_pubs.

* cited by examiner

SYSTEM AND METHOD FOR ADJUSTING ACTUATOR PRESSURE ON AN AGRICULTURAL IMPLEMENT USING A VALVE

FIELD OF THE INVENTION

The present disclosure generally relates to agricultural implements and, more particularly, to systems and methods for adjusting actuator pressure on an agricultural implement by controlling the operation of a valve.

BACKGROUND OF THE INVENTION

Modern farming practices strive to increase yields of agricultural fields. As such, agricultural implements are towed behind a tractor or other work vehicle to perform agricultural operations on a field. In this respect, many agricultural implements include various tools that engage or otherwise interact with the soil present within the field. For example, a seed-planting implement may include a residue removal device positioned at its forward end. Thus, as the seed-planting implement travels across the field to perform a seed-planting operation thereon, the residue removal device sweeps residue away from the path of the implement.

Conditions, such as residue coverage, soil roughness, soil clod size, and/or the like, generally vary throughout the field. In this respect, as an agricultural implement travels across the field, it may be necessary or desirable to adjust one or more operating parameters of the tools on the implement. For example, as field conditions change, the pressures within the actuator associated with the tools may be adjusted to vary the penetration depth and/or force being applied to the tools. As such, systems have been developed that allow the actuator pressure to be adjusted as the implement travels across the field. However, such systems typically respond slowly to changes in field conditions, particularly when conditions change frequently or suddenly.

Accordingly, an improved system and method for adjusting actuator pressure on an agricultural implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for adjusting actuator pressure on an agricultural implement. The system includes an implement frame, a tool adjustably coupled to the implement frame, and a fluid-driven actuator configured to adjust a position of the tool relative to the implement frame, with the fluid-driven actuator defining a fluid chamber. Furthermore, the system includes a valve configured to control a flow of a fluid to the fluid-driven actuator. In addition, the system includes a fluid conduit fluidly coupled between the valve and the fluid chamber. Moreover, the system includes a position sensor configured to capture data indicative of a current position of the tool relative to the implement frame and a computing system communicatively coupled to the position sensor. In this respect, the computing system is configured to determine the current position of the tool relative to the implement frame based on the data captured by the position sensor. Additionally, the computing system is configured to determine a current volume of the fluid chamber and the fluid conduit based on the determined current position. Furthermore, the computing system is configured to control the operation of the valve based on the determined current volume.

In another aspect, the present subject matter is directed to an agricultural implement. The agricultural implement, in turn, includes a row unit frame, a residue removal device having an arm adjustably coupled to the row unit frame and one or more wheels supported for rotation relative to the arm, with the one or more wheels configured to remove residue from a path of the agricultural implement. Furthermore, the agricultural implement includes a fluid-driven actuator configured to adjust a position of the residue removal device relative to the row unit frame, with the fluid-driven actuator defining a fluid chamber. In addition, the agricultural implement includes a valve configured to control a flow of a fluid to the fluid-driven actuator and a fluid conduit fluidly coupled between the valve and the fluid chamber. Moreover, the agricultural implement includes a position sensor configured to capture data indicative of a current position of the residue removal device relative to the row unit frame and a computing system communicatively coupled to the position sensor. In this respect, the computing system is configured to determine the current position of the residue removal device relative to the row unit frame based on the data captured by the position sensor. Additionally, the computing system is configured to determine a current volume of the fluid chamber and the fluid conduit based on the determined position of the residue removal device. Furthermore, the computing system is configured to control the operation of the valve based on the determined position and the determined current volume.

In a further aspect, the present subject matter is directed to a method for adjusting actuator pressure on an agricultural implement. The agricultural implement, in turn, includes a frame, a tool adjustably coupled to the frame, and a fluid-driven actuator configured to adjust a position of a tool relative to the frame, with the fluid-driven actuator defining a fluid chamber. Furthermore, the agricultural implement includes a valve configured to control a flow of a fluid to the fluid-driven actuator and a fluid conduit extending fluidly coupled between the valve and the fluid chamber. The method includes receiving, with the computing system, position sensor data indicative of a current position of the tool relative to the frame. Additionally, the method includes determining, with the computing system, the current position of the tool relative to the implement frame based on the received position sensor data. Moreover, the method includes determining, with the computing system, a current volume of the fluid chamber and the fluid conduit based on the determined current position of the tool. In addition, the method includes controlling, with computing system, the operation of the valve based on the determined current volume.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary

Figure 1:
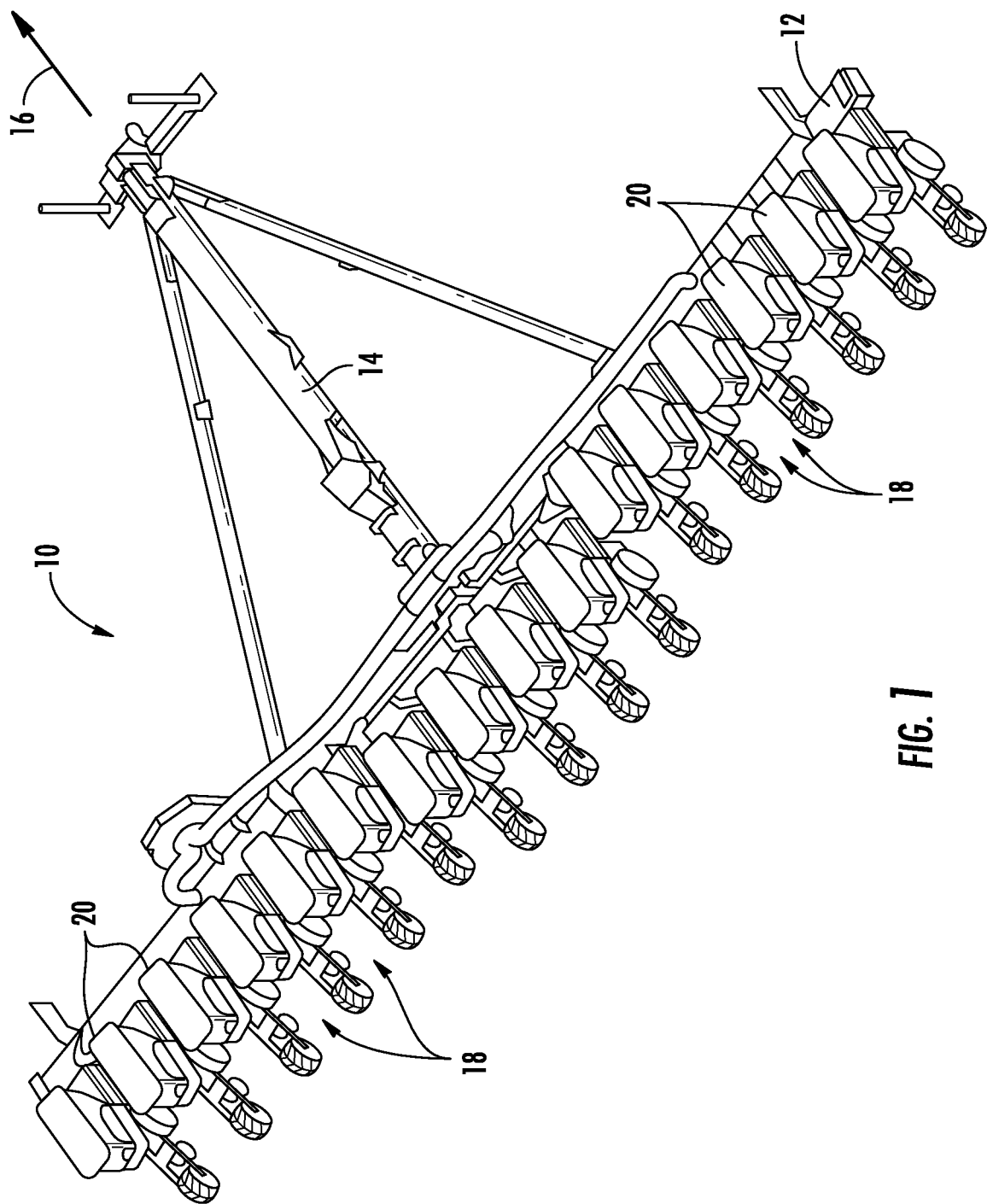
FIG. 1 illustrates a perspective view of one embodiment of an agricultural implement in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for adjusting actuator pressure on an agricultural implement. As will be described below, the agricultural implement may include a frame, a tool adjustably coupled to the implement frame, and a fluid-driven actuator configured to adjust the position of the tool relative to the implement frame. Furthermore, the agricultural implement may include a valve configured to control the flow of a fluid (e.g., air) to the fluid-driven actuator. In addition, the agricultural implement may include a fluid conduit fluidly coupled between the valve and a fluid chamber defined by the fluid-driven actuator.

In several embodiments, a computing system may be configured to control the operation of the valve such that the pressure within the fluid-driven actuator is adjusted from its current pressure to another pressure. More specifically, the computing system may receive data from a position sensor configured to determine the current position of the tool based on received position sensor data. Moreover, the computing system may determine the current volume of the fluid chamber and the fluid conduit based on the determined current position. Additionally, the computing system may determine a valve opening duration to adjust the current pressure to the other pressure based on the determined current volume. In some embodiments, the computing system may determine the valve opening duration based on other parameters, such as the current position of the tool, desired position of the tool, the pressure of the fluid supplied to the valve, the pressure of the fluid within the fluid chamber or fluid conduit, the temperature of the fluid, and/or a geometric flow parameter(s) (e.g., the orifice/conduit size of the fluid conduit) in addition the determined current volume. Thereafter, the computing system may control the operation of the valve such that the valve is opened across the determined valve opening duration.

Using the determined current volume of the fluid conduit and the fluid chamber within the fluid-driven actuator may allow the disclosed system to respond quickly to changes in field conditions. More specifically, as the agricultural implement travels across a field, the tool may move relative to frame (e.g., due to changes in field topography). Such changes in the tool position may, in turn, may result in changes in the volume of and the pressure within the fluid chamber within the fluid-driven actuator. Because air is a highly compressible fluid, the amount of air the valve needs to supply to the fluid conduit and the fluid chamber (and, thus, the valve opening duration) to make a desired adjustment to the pressure within the fluid chamber can vary greatly based on the current volume of the fluid conduit and the fluid chamber. In this respect, by using the current volume of the fluid conduit and the fluid chamber, the pressure within the fluid chamber can be adjusted from its current pressure to a selected other pressure via a single, continuous opening of the valve. Such a pressure adjustment may, in certain instances, move the associated tool from its current position to another position. The use of a single, continuous opening of the valve to adjust the pressure within the fluid-driven actuator generally results in a quicker adjustment than systems relying on the "guess and check" approach of multiple valve opening and closing cycles to move the tool. As such, the disclosed system and method is more responsive to frequent and/or sudden field condition changes.

Referring now to the drawings, FIG. 1 illustrates a perspective view of one embodiment of an agricultural implement 10 in accordance with aspects of the present subject matter. The agricultural implement 10 illustrated herein corresponds to a planter. However, in alternative embodiments, the agricultural implement 10 may generally correspond to any suitable seed-planting implement, such as seeder or another seed-dispensing implement, a side dresser or another fertilizer-dispensing implement, a strip tiller, and/or the like. In further embodiments, the agricultural implement may correspond to any other suitable type of implement, such as a cultivator, disk harrow, or other tillage implement.

As shown in FIG. 1, the agricultural implement 10 may include a laterally extending tool bar or frame assembly 12 connected at its middle to a forwardly extending tow bar 14 to allow the implement 10 to be towed by a work vehicle (not shown), such as an agricultural tractor, in a direction of travel (indicated by arrow 16). The tool bar 12 may generally support a plurality of seed planting units or row units 18. In general, each row unit 18 may be configured to deposit seeds at a desired depth beneath the soil surface and at a desired seed spacing as the agricultural implement 10 is being towed by the work vehicle, thereby establishing rows of planted seeds. In some embodiments, the bulk of the seeds to be planted may be stored in one or more central hoppers (not shown) supported on the tool bar 12 and/or the tow bar 14. Thus, as seeds are planted by the row units 18, a pneumatic distribution system (not shown) may distribute seeds from the central hopper(s) to seed tanks 20 to the individual row units 18.

The agricultural implement 10 may include any number of row units 18, such as six, eight, twelve, sixteen, twenty-four, thirty-two, or thirty-six row units. In addition, the lateral spacing between row units 18 may be selected based on the type of crop being planted. For example, the row units 18 may be spaced approximately thirty inches from one another for planting corn and approximately fifteen inches from one another for planting soybeans.

Figure 2:
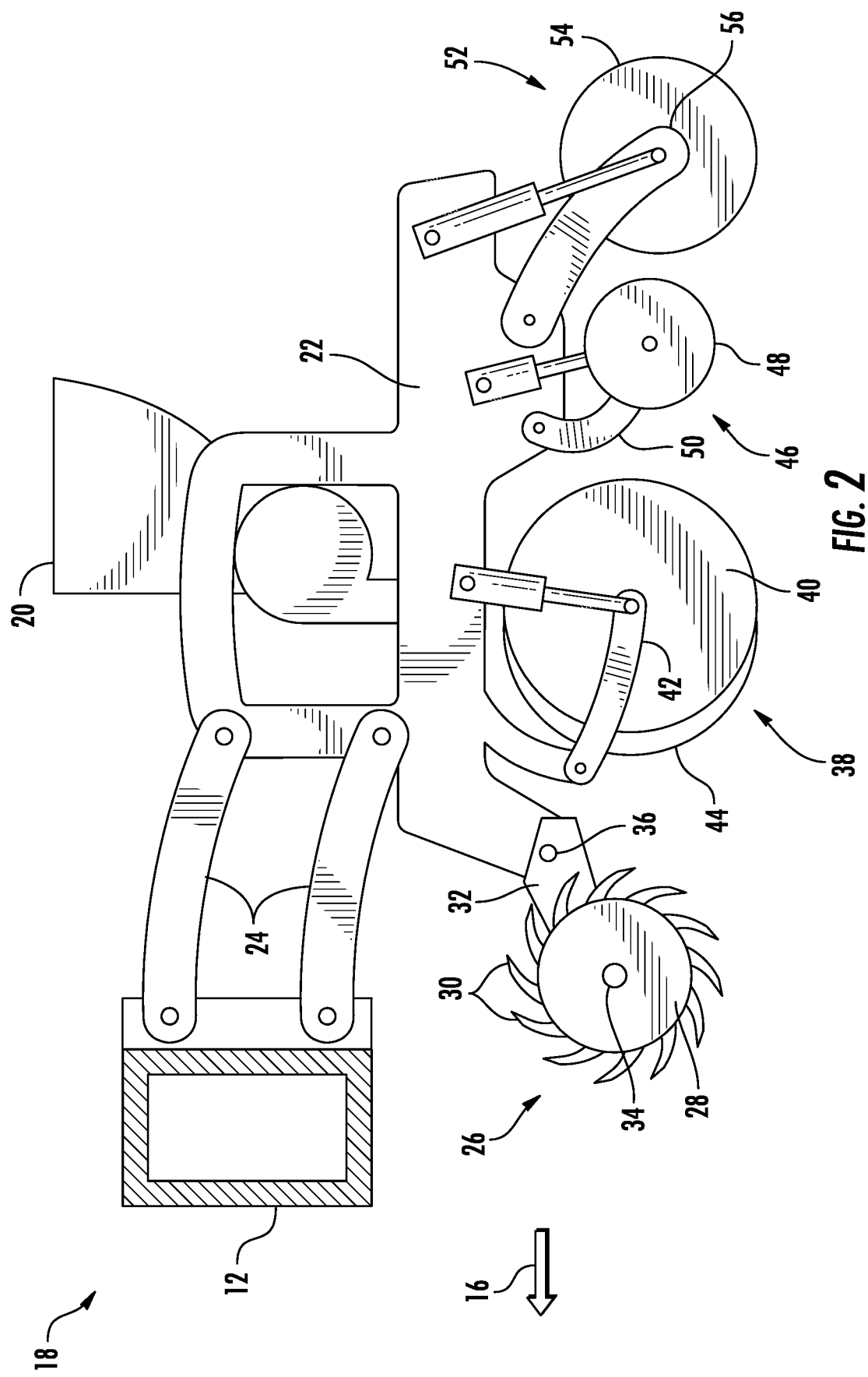
FIG. 2 illustrates a side view of one embodiment of a row unit of an agricultural implement in accordance with aspects of the present subject matter.

Referring now to FIG. 2, a side view of one embodiment of a row unit 18 is illustrated in accordance with aspects of the present subject matter. As shown, the row unit 18 may include a row unit frame 22 adjustably coupled to the tool bar 12 by links 24. For example, one end of each link 24 may be pivotably coupled to the row unit frame 22, while an opposed end of each link 24 may be pivotably coupled to the tool bar 12. However, in alternative embodiments, the row unit 18 may be coupled to the tool bar 12 in any other suitable manner.

As shown in FIG. 2, the row unit 18 includes a residue removal device 26 pivotably coupled to the row unit frame 22 at its forward end relative to the direction of travel 16. In general, the residue removal device 26 may be configured to break up and/or sweep away or otherwise remove residue, dirt clods, and/or the like from the path of the row unit 18. As such, in several embodiments, the residue removal device 26 may include a pair of wheels 28 (one is shown), with each wheel 28 having a plurality of tillage points or fingers 30. As such, the wheels 28 may be configured to roll relative to the soil as the agricultural implement 10 travels across the field such that the fingers 30 break up and/or sweep away residue and dirt clods. Additionally, the residue removal device 26 may include a support arm 32 that adjustably couples the wheels 28 to the row unit frame 22. For example, one end of the support arm 32 may be pivotably coupled to the wheels 28 via an axle 34, while an opposed end of the support arm 32 may be pivotably coupled to the row unit frame 22 via a pivot joint 36. However, in alternative embodiments, the residue removal device 26 may have any other suitable configuration. For example, in one embodiment, the residue removal device 26 may include only a single wheel 28.

Additionally, the row unit 18 may include one or more additional tools positioned aft of the residue removal device 26 relative to the direction of travel 16. As such, the additional tool(s) may be configured to interact with soil at a location(s) aft of the residue removal device 26. In this respect, and as will be described below, the additional tool(s) may facilitate the formation and subsequent closing of a furrow or trench within the soil into which seeds are deposited.

In several embodiments, an opening assembly 38 may be supported on the row unit frame 22. In general, the opening assembly 38 may be configured to form the furrow or trench within the soil. More specifically, in some embodiments, the opening assembly 38 may include a gauge wheel 40 adjustably coupled to the row unit frame 22 via a support arm 42. Furthermore, the opening assembly 38 may also include one or more opener disks 44 configured to excavate a furrow or trench within the soil. Thus, as the agricultural implement 10 travels across the field, the gauge wheel 40 may be configured to engage the top surface of the soil. In this respect, the position of the gauge wheel 40 relative to the row unit frame 22 may set the penetration of the opener disk(s) 44 (and, thus, the depth of the furrow being excavated).

Moreover, in several embodiments, a closing assembly 46 may be supported on the row unit frame 22. In general, the closing assembly 46 may be configured to close the furrow or trench within the soil by the opening assembly 38. Specifically, in some embodiments, the closing assembly 46 may include a pair of closing disks 48 (one is shown) adjustably coupled to the row unit frame 22 via a support arm 50. In this respect, the closing disks 48 may be positioned relative to each other such that soil flows between the disks 48 as the agricultural implement 10 travels across the field. As such, the closing disks 58 may be configured to collapse or otherwise close the furrow after seeds have been deposited therein, such as by pushing the excavated soil into the furrow. However, in alternative embodiments, the closing assembly 46 may have any other suitable configuration. For example, in one embodiment, the closing assembly 46 may have closing wheels (not shown) in lieu of the closing disks 48.

Furthermore, in several embodiments, a press wheel assembly 52 may be supported on the row unit frame 22. Specifically, in some embodiments, the press wheel assembly 52 may include a press wheel 54 adjustably coupled to the row unit frame 22 via a support arm 56. In this respect, as the agricultural implement 10 travels across the field, the press wheel 54 may roll over the closed furrow to firm the soil over the seed and promote favorable seed-to-soil contact. However, in alternative embodiments, the press wheel assembly 52 may have any other suitable configuration.

Additionally, in alternative embodiments, the row unit 18 may include any other suitable tools in addition to or in lieu of the opening assembly 38, the closing assembly 46, and the press wheel assembly 52. Moreover, in some embodiments, the row unit 18 may include only the opening assembly 38 and the closing assembly 46.

Figure 3:
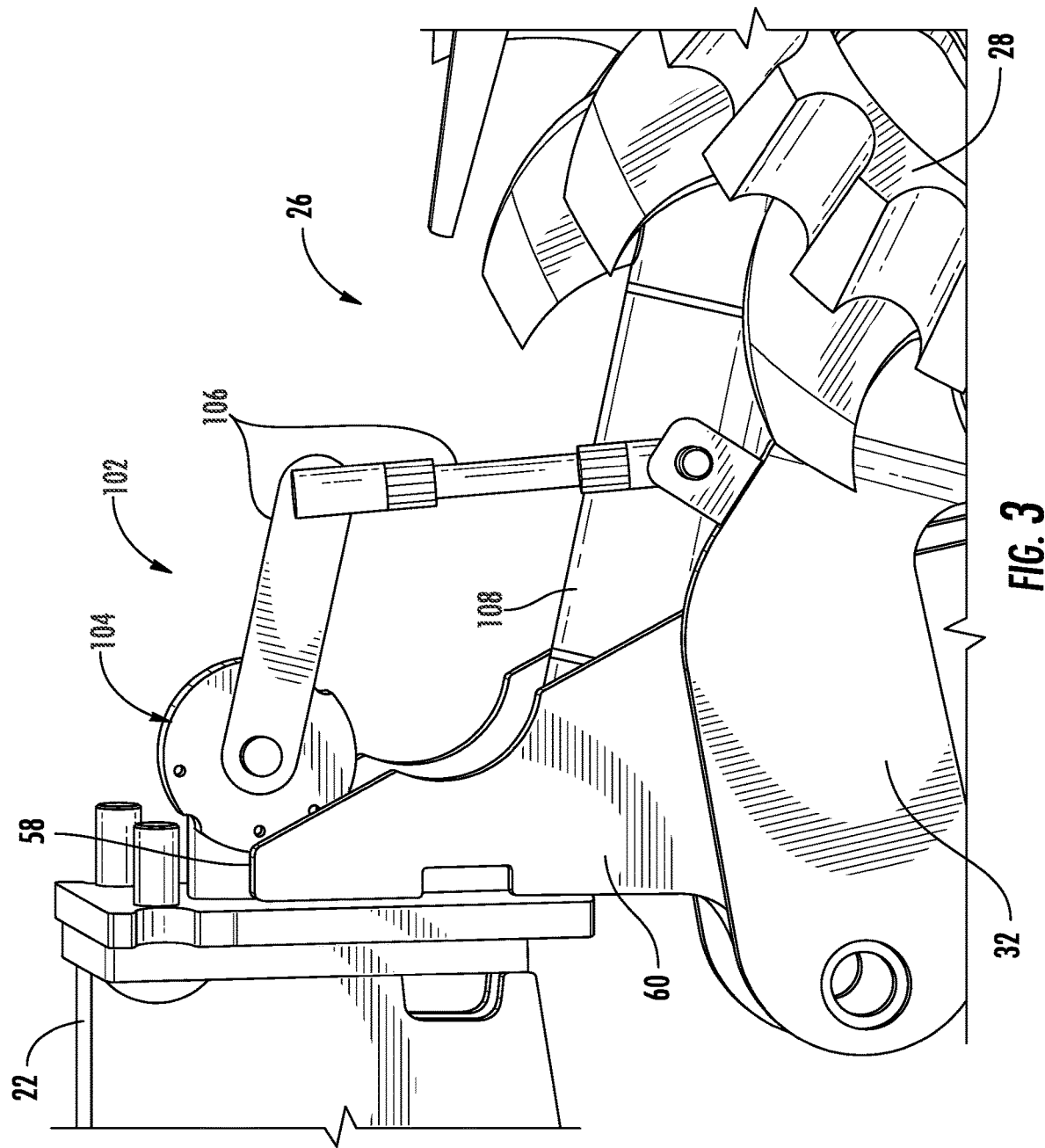
FIG. 3 illustrates a side view of one embodiment of a position sensor in operative association with the row unit shown in FIG. 2.

Referring now to FIG. 3, a side view of one embodiment of a position sensor 102 in operative association with the row unit 18 is illustrated in accordance with aspects of the present subject matter. In general, the position sensor 102 may be configured to capture data indicative of the position of the residue removal device 26 (and, more specifically, the wheels 28) relative to the row unit frame 22. As will be described below, the data captured by the position sensor 102 may be used when actively adjusting the position of the residue removal device 26 relative to the row unit frame 22.

The position sensor 102 may correspond to any suitable sensor or sensing device capable of capturing data indicative of the position of the wheels 28 of the residue removal device 26 relative to the row unit frame 22. In several embodiments, the position sensor 102 may be coupled between the row unit frame 22 and the arm 32 of the residue removal device 26. In such embodiments, the position sensor 102 may include a rotary sensor 104 (e.g., a rotary potentiometer or a magnetic rotary sensor) coupled to a bracket 58 (which is, in turn, coupled to the row unit frame 22) or the arm 32 and an associated sensor linkage 106 coupled between the rotary sensor 104 and the other of the bracket 58 or the arm 32. For instance, as shown in the illustrated embodiment, the rotary sensor 104 is coupled the bracket 58, with the sensor linkage 106 coupled between the rotary sensor 104 and the arm 32. As such, the vertical position of the arm 32 relative to the row unit frame 22 may be detected by the rotary sensor 104 via the mechanical linkage provided by the sensor linkage 112. Thus, the position of the wheels 28 relative to the row unit frame 22 can be determined based on the data captured by the rotary sensor 104. However, in alternative embodiments, the position sensor 102 may correspond to any other suitable sensor or sensing device.

Additionally, as shown, the residue removal device 26 may include a fluid-driven actuator 108 coupled between a bracket 60 (which is, in turn, coupled to the row unit frame 22) and the arm 32. In this respect, the fluid-driven actuator 108 may be configured to adjust the position of the residue removal device 26 (and, more specifically, the wheels 28) relative to the row unit frame 22. Based on the position of the residue removal device 26 relative to the row unit frame 22, the pressure of the fluid therein, and the conditions of the field, the fluid-driven actuator 108 may apply a force on the arm 32. This force may, in turn, press or otherwise cause the wheels 28 of the residue removal device 26 to engage the surface of the field such that the wheels 28 roll relative to the soil and remove residue from the path of the row unit 18. In the illustrated embodiment, the fluid-driven actuator 108 corresponds to a pneumatic cylinder. However, in alternative embodiments, the fluid-driven actuator may correspond to a hydraulic cylinder.

It should be appreciated that the configuration of the agricultural implement 10 described above and shown in FIGS. 1-3 is provided only to place the present subject matter in an exemplary field of use. Thus, it should be appreciated that the present subject matter may be readily adaptable to any manner of implement configuration.

Figure 4:
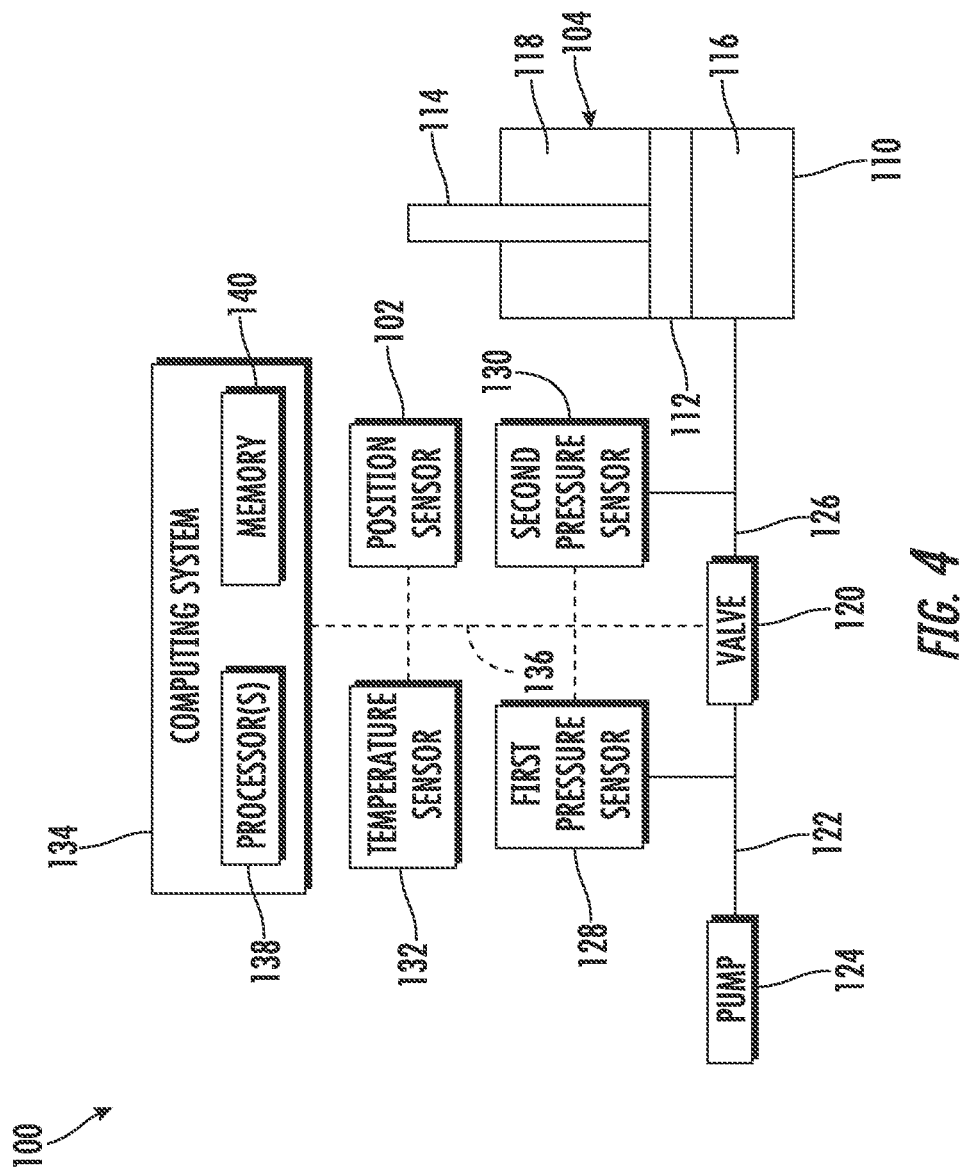
FIG. 4 illustrates a schematic view of one embodiment of a system for adjusting actuator pressure on an agricultural implement in accordance with aspects of the present subject matter.

Referring now to FIG. 4, a schematic view of one embodiment of a system 100 for adjusting actuator pressure on an agricultural implement is illustrated in accordance with aspects of the present subject matter. In general, the system 100 will be described herein with reference to the agricultural implement 10 described above with reference to FIGS. 1-3. However, it should be appreciated by those of ordinary skill in the art that the disclosed system 100 may generally be utilized with agricultural implements having any other suitable implement configuration.

As shown in FIG. 4, the system 100 may include one or more fluid-driven actuators of the agricultural implement 10. In this respect, as will be described below, the system 100 may be configured to control the flow of a fluid, such as air, to the fluid-driven actuator(s) to adjust the position(s) of the associated tool(s). For example, in the illustrated embodiment, the system 100 includes the fluid-driven actuator 108 coupled between the residue removal device 26 and the row unit frame 22. In such an embodiment, the system 100 may be configured to control the flow of air to the fluid-driven actuator 108 to adjust the pressure within the actuator 108 and, thus, the position of the residue removal device 26 and the row unit frame 22. Such a pressure adjustment of the residue removal device 26 may be in response to changes in the conditions (e.g., residue coverage) of the field across which the implement 10 is traveling.

Although a single fluid-driven actuator configured to adjust the position of a single tool is shown for purposes of clarity, the system 100 may include any other suitable number of fluid-driven actuators configured to adjust the position(s) of any other suitable number of tools on the agricultural implement 10. Moreover, in alternative embodiments, the fluid-driven actuator(s) of the system 100 may be configured adjust the position of any other suitable tools of the implement 10, such as the gauge wheel 40, the closing assembly 46, the press wheel assembly 52, a tillage tool(s) (not shown), a wheel(s) (not shown), etc. In addition, although the fluid-driven actuator described is a pneumatic cylinder, the fluid-driven actuator may correspond to any other suitable fluid-driven device, such as a hydraulic cylinder.

In general, the fluid-driven actuator(s) of the system 100 may have any suitable configuration. For example, as shown, the fluid-driven actuator 108 includes a cylinder 110 housing a piston 112 therein. Moreover, as shown, the fluid-driven actuator 108 includes a rod 114 coupled to the piston 112 and extending outward from the cylinder 110. As such, the fluid-driven actuator 108 may include a cap-side chamber 116 and a rod-side chamber 118 defined within the cylinder 122. In this respect, by regulating the flow of the fluid supplied to one or both fluid chambers 116, 118, the actuation of the rod 114 may be controlled. Such actuation of the rod 114 may, in turn, control the position of the associated tool (e.g., the residue removal device 26).

Furthermore, the system 100 may include one or more valves and associated fluid conduits to control the supply of fluid the fluid-driven actuator(s). For example, in the illustrated embodiment, the system 100 includes a valve 120 configured to control the flow of air to the cap-side chamber 116 of the fluid-driven actuator 108. Additionally, in the embodiment shown in FIG. 4, the system 100 includes a first fluid conduit 122 fluidly coupled between a pump 124 and the valve 120. The pump 124 may, in turn, be configured to generate a flow of pressurized through the first fluid conduit 122. Moreover, in the embodiment shown in FIG. 4, the system 100 includes a second fluid conduit 126 fluidly coupled between the valve 120 and the cap-side chamber 116 of the fluid-driven actuator 104. As will be described below, the valve 120 may be opened to allow the pressurized air from the pump 124 to flow into the second fluid conduit 126 and the cap-side chamber 116 of the fluid-driven actuator 116. Thus, by opening the valve 120 across a particular valve opening duration, a specific amount of pressurized air can be supplied to the second fluid conduit 126 and the cap-side chamber 116 to adjust the pressure therein from its current pressure to a specified new pressure, which may adjust the position of the residue removal device 26 from its current position to a specified new position.

For the purposes of clarity, the system 100 illustrated in FIG. 4 includes only a single valve and a single fluid conduit fluidly coupled between the valve and the fluid-driven actuator. However, the system 100 may include any other suitable number of valves and/or fluid conduits. For example, in some embodiments, the system 100 may include several fluid-driven actuators and a single valve, with a fluid conduit extending between the valve and each actuator. In such embodiments, the single valve can control the operation of several fluid-driven actuators and associated tools. In other embodiments, the system 100 may include several valves and several fluid conduits. In such embodiments, each valve may be configured to control one or more of the fluid-driven actuators. Thus, each fluid-driven actuator or each group of fluid-driven actuators can be independently controlled.

Furthermore, in the illustrated system 100, only the flow of the air to the cap-side chamber 116 is controlled by a valve. In alternative embodiments, the system 100 may include a first valve configured to control the flow of air to the cap-side chamber 116 and a second valve configured to control the flow of air to the rod-side chamber 118. In such embodiments, by controlling the flow of air both fluid chambers 116, 118 of the fluid-driven actuator 108, the movement of the rod 114 both into and out of the cylinder 110 can be controlled. This, in turn, allows for active control of the movement of the residue removal device 26 toward and away from the row unit frame 22. In addition, the system 100 may include any other suitable fluid components.

Moreover, the system 100 may include one or more sensors of the agricultural implement 10 and/or the associated work vehicle (not shown). For example, in several embodiments, the system 100 may include the position sensor 102 in operative association with residue removal device 26.

Additionally, in some embodiments, the system 100 may include first and second pressure sensors 128, 130. More specifically, in such embodiments, the first pressure sensor 128 may be configured to capture data indicative of the pressure of the fluid supplied to the valve 120 (e.g., the pressure of the fluid being discharged by the pump 124 or within the first fluid conduit 122). Conversely, in such embodiments, the second pressure sensor 130 may be configured to capture data indicative of the pressure of the fluid within the second fluid conduit 126 or the cap-side chamber 110. In this respect, the first and second pressure sensors 128, 130 may correspond to any suitable pressure-sensing devices, such as a diaphragm pressure sensor(s), a piston pressure sensor(s), a strain gauge-based pressure sensor(s), an electromagnetic pressure sensor(s), and/or the like. As will be described below, the data captured by the first and second pressure sensors 128, 130 may be used when actively adjusting the position of the residue removal device 26 relative to the row unit frame 22.

Furthermore, in some embodiments, the system 100 may include a temperature sensor 130. In general, the temperature sensor 130 may be configured to capture data indicative of an ambient temperature, such as the ambient temperature adjacent to the fluid-driven actuator 108, the first fluid conduit 122, and/or the second fluid conduit 126. In several embodiments, when the fluid is air, the temperature of the fluid within the fluid-driven actuator 108, the first fluid conduit 122, and/or the second fluid conduit 126 may be assumed to be the same as the ambient temperature. In this respect, the temperature sensor 130 may correspond to any suitable temperature-sensing device, such as a thermistor, thermocouple, and/or the like. As will be described below, the data captured by the temperature sensor 130 may be used when actively adjusting the position of the residue removal device 26 relative to the row unit frame 22.

In accordance with aspects of the present subject matter, the system 100 may include a computing system 134 communicatively coupled to one or more components of the agricultural implement 10 and/or the system 100 to allow the operation of such components to be electronically or automatically controlled by the computing system 134. For instance, the computing system 134 may be communicatively coupled to the various sensors 102, 128, 130, 132 of the system 100 via a communicative link 136. As such, the computing system 134 may be configured to receive data from the sensors 102, 128, 130, 132 that is indicative of one or more parameters associated with the operation of the fluid-driven actuator(s) (e.g., the fluid-driven actuator 108) of the system 100. Moreover, the computing system 134 may be communicatively coupled to the fluid-driven actuator(s) (e.g., the fluid-driven actuator 108) of the sprayer 10 via the communicative link 136. In this respect, the computing system 134 may be configured to control the operation of such actuator(s) in a manner that adjusts the position of the associated tool(s) (e.g., the residue removal device 26). Additionally, the computing system 134 may be communicatively coupled to any other suitable components of the sprayer 10 and/or the system 100.

In general, the computing system 134 may comprise one or more processor-based devices, such as a given controller or computing device or any suitable combination of controllers or computing devices. Thus, in several embodiments, the computing system 134 may include one or more processor(s) 138 and associated memory device(s) 140 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 140 of the computing system 134 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 140 may generally be configured to store suitable computer-readable instructions that, when implemented by the processor(s) 138, configure the computing system 134 to perform various computer-implemented functions, such as one or more aspects of the methods and algorithms that will be described herein. In addition, the computing system 134 may also include various other suitable components, such as a communications circuit or module, one or more input/output channels, a data/control bus and/or the like.

The various functions of the computing system 134 may be performed by a single processor-based device or may be distributed across any number of processor-based devices, in which instance such devices may be considered to form part of the computing system 134. For instance, the functions of the computing system 134 may be distributed across multiple application-specific controllers or computing devices, such as a navigation controller, an engine controller, a transmission controller, an implement controller, and/or the like.

Figure 5:
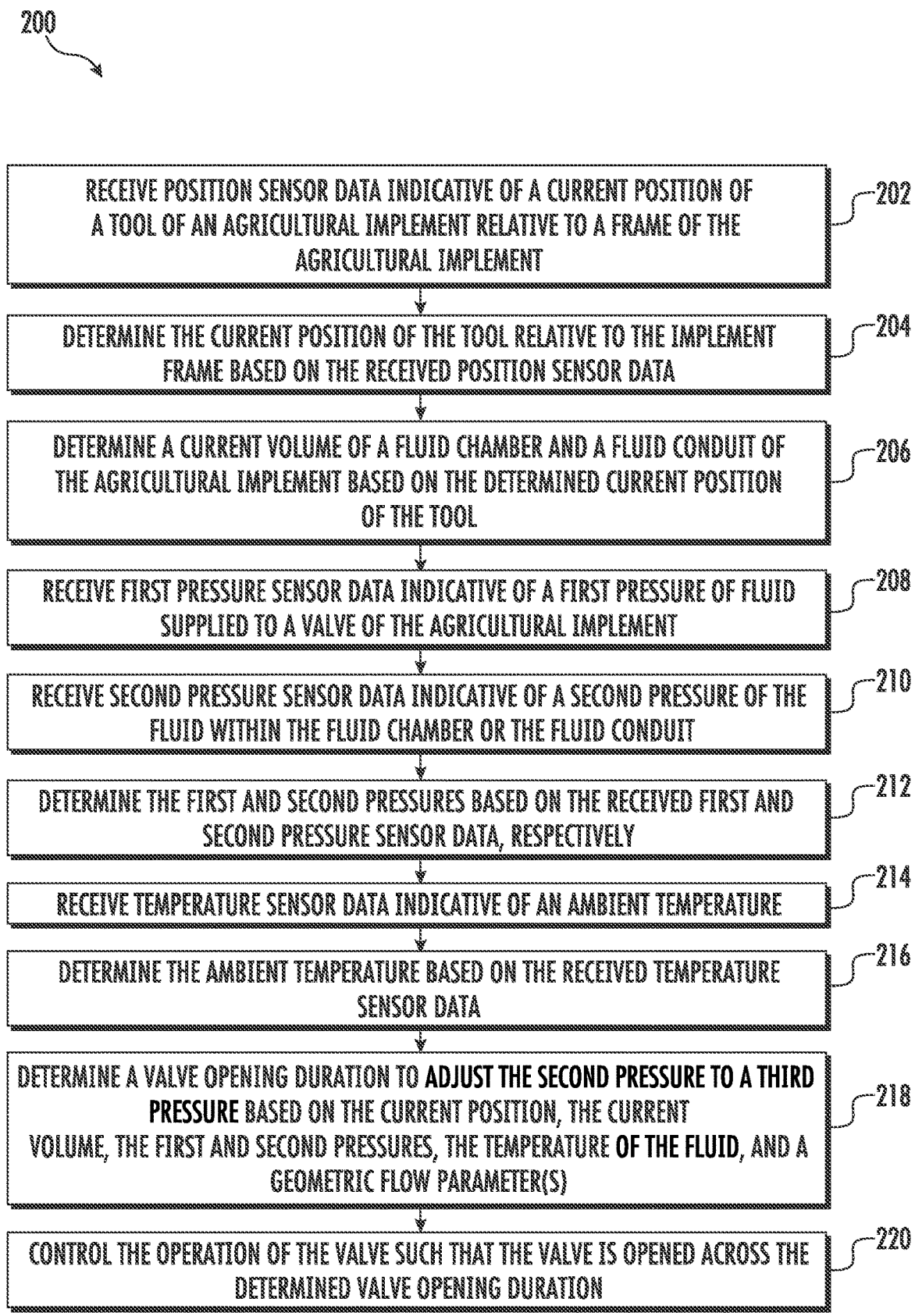
FIG. 5 illustrates a flow diagram providing one embodiment of example control logic for adjusting actuator pressure on an agricultural implement in accordance with aspects of the present subject matter.

Referring now to FIG. 5, a flow diagram of one embodiment of example control logic 200 that may be executed by the computing system 134 (or any other suitable computing system) for adjusting actuator pressure on an agricultural implement is illustrated in accordance with aspects of the present subject matter. Specifically, the control logic 200 shown in FIG. 5 is representative of steps of one embodiment of an algorithm that can be executed to adjust actuator pressure on an agricultural implement in a manner that improves the responsiveness of the actuator(s) of the implement to changes in field conditions. Thus, in several embodiments, the control logic 200 may be advantageously utilized in association with a system installed on or forming part of an agricultural implement to allow for real-time tool position control without requiring substantial computing resources and/or processing time. However, in other embodiments, the control logic 200 may be used in association with any other suitable system, application, and/or the like for controlling the actuator pressure of an agricultural implement.

The control logic 200 will be described below in the context of controlling the pressure within the fluid-driven actuator 108 to adjust the position of the residue removal device 26 of the agricultural implement 10 relative to the row unit frame 22 of the implement 10. However, in alternative embodiments, the control logic 200 may be used to control the pressure within of any other suitable actuator on any other suitable agricultural implement. For example, in one alternative embodiment, the control logic 200 may be used to control the pressure within an actuator associated with of a ground-engaging tool (e.g., a shank) of a tillage implement.

As shown in FIG. 5, at (202), the control logic 200 includes receiving position sensor data indicative of a current position of a tool of an agricultural implement relative to a frame of the agricultural implement. For example, as indicated above, the computing system 134 may be communicatively coupled to the position sensor 102 via the communicative link 136. In this respect, as the agricultural implement 10 travels across the field to perform an agricultural operation thereon, the computing system 134 may receive position sensor data indicative of the position of the residue removal device 26 relative to the row unit 22.

Furthermore, at (204), the control logic 200 includes determining the current position of the tool relative to the implement frame based on the received position sensor data. For example, the computing system 134 may be configured to determine the current position of the residue removal device 26 relative to the row unit frame 22 based on the received position sensor data. In this respect, the computing system 134 may include a look-up table(s), suitable mathematical formula, and/or algorithms stored within its memory device(s) 140 that correlates the received sensor data to the tool position.

Additionally, at (206), the control logic 200 includes determining a current volume of a fluid chamber defined by a fluid-driven actuator of the agricultural implement and a fluid conduit of the agricultural implement based on the determined current position. For example, the computing system 134 may be configured to determine the current volume of both the second fluid conduit 126 and the cap-side chamber 116 of the fluid-driven actuator 108 based on the received position sensor data. In this respect, the computing system 134 may include a look-up table(s), suitable mathematical formula, and/or algorithms stored within its memory device(s) 140 that correlates the determined current position of the residue removal device 26 to the current volume. As will be described below, the current volume may be used (in combination with other parameters) control the operation of the valve 120 during the performance of an agricultural operation.

As shown in FIG. 5, at (208), the control logic 200 includes receiving first pressure sensor data indicative of a first pressure of the fluid supplied to a valve of the agricultural implement. For example, as indicated above, the computing system 134 may be communicatively coupled to the first pressure sensor 128 via the communicative link 136. In this respect, as the agricultural implement 10 travels across the field to perform the agricultural operation, the computing system 134 may receive first pressure sensor data indicative of the pressure of the air being discharged by the pump 124 or otherwise present within the first conduit 122.

Moreover, at (210), the control logic 200 includes receiving second pressure sensor data indicative of a second pressure of the fluid within the fluid chamber or the fluid conduit. For example, as indicated above, the computing system 134 may be communicatively coupled to the second pressure sensor 130 via the communicative link 136. In this respect, as the agricultural implement 10 travels across the field to perform the agricultural operation, the computing system 134 may receive second pressure sensor data indicative of the pressure of the air within the cap-side chamber 116 or the second fluid conduit 126.

In addition, at (212), the control logic 200 includes determining the first and second pressures based on the received first and second pressure sensor data, respectively. For example, the computing system 134 may be configured to determine the pressure of the air being discharged by the pump 124 or otherwise within the first conduit 122 based on the received first pressure sensor data. Moreover, the computing system 134 may determine the pressure of the air within the cap-side chamber 116 or the second fluid conduit 126 based on the received second pressure sensor data. In this respect, the computing system 134 may include a look-up table(s), suitable mathematical formula, and/or algorithms stored within its memory device(s) 140 that correlates the received sensor data to the pressures.

As shown in FIG. 5, at (214), the control logic 200 includes receiving temperature sensor data indicative of an ambient temperature. For example, as indicated above, the computing system 134 may be communicatively coupled to the temperature 132 via the communicative link 136. In this respect, as the agricultural implement 10 travels across the field to perform the agricultural operation, the computing system 134 may receive temperature sensor data indicative of the ambient temperature.

Furthermore, at (216), the control logic 200 includes determining the temperature of the fluid within the fluid chamber and the fluid conduit based on the received temperature sensor data. For example, the computing system 134 may be configured to determine the temperature, of the fluid within the fluid-driven actuator 108, the first fluid conduit 122, and/or the second fluid conduit 126, based on the received temperature sensor data. In this respect, the computing system 134 may include a look-up table(s), suitable mathematical formula, and/or algorithms stored within its memory device(s) 140 that correlates the received sensor data to the ambient temperature. As mentioned above, in some embodiments, the temperature of the fluid within the fluid-driven actuator 108, the first fluid conduit 122, and/or the second fluid conduit 126 may be assumed to be the same as the ambient temperature.

Additionally, at (218), the control logic 200 includes determining a valve opening duration to adjust the pressure within the fluid-driven actuator from the current or second pressure to a third or another pressure based on the determined current position, the determined current volume, the determined first and second pressures, the determined temperature of the fluid, and one or more geometric flow parameters. For example, the computing system 134 may determine a valve opening duration based on the determined current position (e.g., as determined at (204)), the determined current volume (e.g., as determined at (206)), the determined first and second pressures (e.g., as determined at (212)), the determined temperature of the fluid (e.g., as determined at (216)), one or more geometric flow parameters (e.g., the orifice/conduit size of the second fluid conduit 126), and the desired or third pressure within the fluid-driven actuator 108 (which may be determined based on field conditions or from an operator input). As will be described below, when the valve 204 is opened across the determined valve opening duration, the pressure within the fluid-driven actuator is changed from the current or second pressure to desired or third pressure. Such a pressure change may move the residue removal device 26 from its current position to a new position. However, in alternative embodiments, at (218), the determined current volume may be used in addition to only one of or some of the current position, first and second pressures, temperature of the fluid, and geometric flow parameter(s).

Moreover, at (220), the control logic 200 includes controlling the operation of the valve such that the valve is opened across the determined valve opening duration. For example, the computing system 134 may transmit control signals to the valve 120 via the communicative link 136. The control signals may, in turn, instruct the valve 120 to open across the determined valve opening duration. Specifically, the valve 120 may be continuously across the determined valve opening duration such that the pressure within the fluid-driven actuator 108 is adjust from its current or second pressure to the desired other or third pressure with a single opening of the valve 120.

In general, the control 200 disclosed herein allows the pressure within the fluid-driven actuator 108 associated with the residue removal device 26 to be adjusted more quickly and without the "guess and check" approach that has typically been used. More specifically, air is a highly compressible fluid. As such, the amount of air that needs to be supplied to the fluid-driven actuator 108 (and, thus, the necessary valve opening duration of the valve 108) to adjust the pressure within the fluid-driven actuator 108 to a specified pressure can vary greatly depending on various parameters. Such parameters may include the current volume of the cap-side chamber 116 and the second fluid conduit 126, the current position of the residue removal device 26, the pressure of fluid being supplied to the valve 120, the current and desired pressures of the fluid within the second fluid conduit 126 or the cap-side chamber 116, the temperature of the fluid, and/or geometric flow parameter(s) (e.g., of the second fluid conduit 126). The current volume is particularly important. In this respect, by using these parameters (or a portion thereof) to control the operation of the valve 120, the pressure within the fluid-driven actuator can be adjusted from its current pressure to a selected or desired other pressure via a single, continuous opening of the valve 120. The use of a single, continuous opening of the valve 120 to adjust the pressure within the fluid-driven actuator 108 generally results in a quicker adjustment than systems relying on the "guess and check" approach (i.e., multiple valve opening and closing cycles) to adjust actuator pressure.

Figure 6:
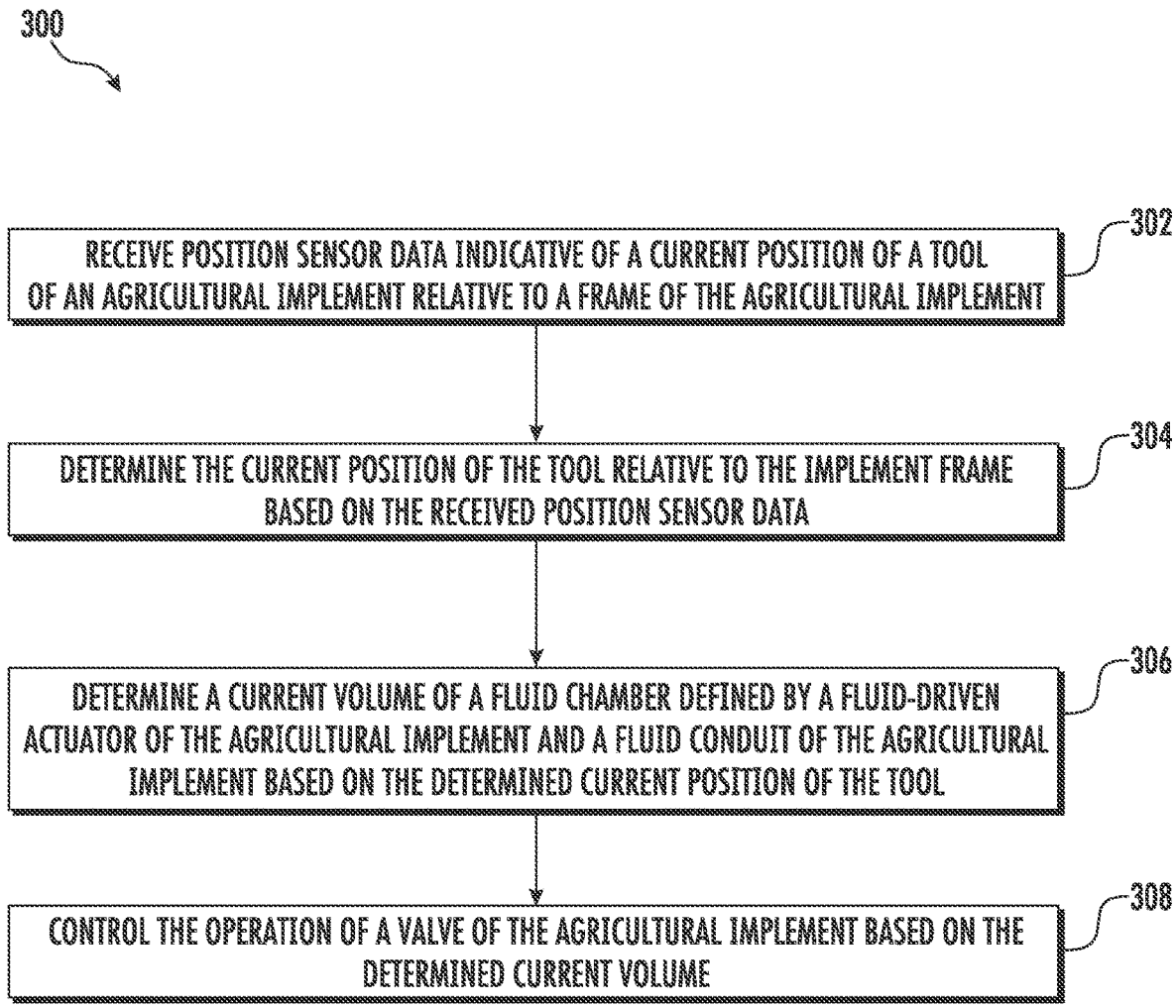
FIG. 6 illustrates a flow diagram of one embodiment of a method for adjusting actuator pressure on an agricultural implement in accordance with aspects of the present subject matter.

Referring now to FIG. 6, a flow diagram of one embodiment of a method 300 for adjusting actuator pressure on an agricultural implement is illustrated in accordance with aspects of the present subject matter. In general, the method 300 will be described herein with reference to the agricultural implement 10 and the system 100 described above with reference to FIGS. 1-5. However, it should be appreciated by those of ordinary skill in the art that the disclosed method 300 may generally be implemented with any agricultural implement having any suitable implement configuration and/or within any system having any suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (302), the method 300 may include receiving, with the computing system, position sensor data indicative of a current position of a tool of an agricultural implement relative to a frame of the agricultural implement. For instance, as described above, the computing system 134 may receive data from a position sensor 102. Such sensor data may, in turn, be indicative of the position of the residue removal device 26 relative to the row unit frame 22.

Additionally, at (304), the method 300 may include determining, with the computing system, the current position of the tool relative to the implement frame based on the received position sensor data. For instance, as described above, the computing system 134 may determine the position of the residue removal device 26 relative to the row unit frame 22 based on the received sensor data.

Moreover, as shown in FIG. 5, at (306), the method 300 may include determining, with the computing system, a current volume of a fluid chamber defined by a fluid-driven actuator of the agricultural implement and a fluid conduit of the agricultural implement based on the determined current position of the tool. For instance, as described above, the computing system 134 may calculate or determine the current volume of the second fluid conduit 126 and the cap-side chamber 116 of the fluid-driven actuator 108 based on the determined current position of the residue removal device.

Furthermore, at (308), the method 300 may include controlling, with computing system, the operation of a valve of the agricultural implement based on the determined current volume. For instance, as described above, the computing system 124 may control the operation of the valve 120 in a manner that adjusts the pressure within the fluid-driven actuator 108 associated with the residue removal device 26 based on the determined current volume.

It is to be understood that the steps of the control logic 200 and the method 300 are performed by the computing system 134 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 134 described herein, such as the control logic 200 and the method 300, is implemented in software code or instructions which are tangibly stored on a tangible computer readable medium. The computing system 134 loads the software code or instructions via a direct interface with the computer readable medium or via a wired and/or wireless network. Upon loading and executing such software code or instructions by the computing system 134, the computing system 134 may perform any of the functionality of the computing system 134 described herein, including any steps of the control logic 200 and the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for adjusting actuator pressure on an agricultural implement, the system comprising:
an implement frame;
a tool adjustably coupled to the implement frame;
a fluid-driven actuator configured to adjust a position of the tool relative to the implement frame, the fluid-driven actuator defining a fluid chamber;
a valve configured to control a flow of a fluid to the fluid-driven actuator;
a fluid conduit fluidly coupled between the valve and the fluid chamber;
a position sensor configured to capture data indicative of a current position of the tool relative to the implement frame;
a first pressure sensor configured to capture data indicative of a current first pressure of the fluid supplied to the valve;
a second pressure sensor configured to capture data indicative of a current second pressure of the fluid within the fluid chamber or the fluid conduit;
a temperature sensor configured to capture data indicative of an ambient temperature; and
a computing system communicatively coupled to the position sensor, the first pressure sensor, the second pressure sensor, and the temperature sensor, wherein the computing system:
determines the current position of the tool relative to the implement frame based on the data captured by the position sensor;
determines the current first and second pressures based on the data captured by the first and second pressure sensors, respectively;
determines the current temperature of the fluid based on the data captured by the temperature sensor;
determines a current volume of the fluid chamber and the fluid conduit based on the determined current position; and
controls the operation of the valve based on the determined current volume, the determined current first and second pressures, and the determined current temperature.

2. The system of claim 1, wherein, when controlling the operation of the valve, the computing system controls the operation of the valve based on the determined current position, the determined current volume, the determined current first and second pressures, and the determined current temperature.

3. The system of claim 2, wherein, when controlling the operation of the valve, the computing system further:
determines a valve opening duration to adjust the second pressure within the fluid chamber or the fluid conduit from the determined current second pressure to another second pressure based on the determined current volume, the determined current position, the determined current first and second pressures, and the determined current temperature; and
controls the operation of the valve such that the valve is opened across the determined valve opening duration.

4. The system of claim 3, wherein, when controlling the operation of the valve, the computing system further controls the operation of the valve such that the valve is opened continuously across the determined valve opening duration such that the second pressure within the fluid chamber or the fluid conduit is changed from the determined current second pressure to the other second pressure.

5. The system of claim 1, wherein, when controlling the operation of the valve, the computing system controls the operation of the valve based on a geometric flow parameter, the determined current volume, the determined current first and second pressures, and the determined current temperature.

6. The system of claim 1, wherein the position sensor comprises a rotary sensor and a sensor linkage.

7. The system of claim 1, wherein the fluid comprises air.

8. An agricultural implement, comprising:
a row unit frame;
a residue removal device including an arm adjustably coupled to the row unit frame and one or more wheels supported for rotation relative to the arm, the one or more wheels configured to remove residue from a path of the agricultural implement;
a fluid-driven actuator configured to adjust a position of the residue removal device relative to the row unit frame, the fluid-driven actuator defining a fluid chamber;
a valve configured to control a flow of a fluid to the fluid-driven actuator;
a fluid conduit fluidly coupled between the valve and the fluid chamber;
a position sensor configured to capture data indicative of a current position of the residue removal device relative to the row unit frame;
a first pressure sensor configured to capture data indicative of a current first pressure of the fluid supplied to the valve;
a second pressure sensor configured to capture data indicative of a current second pressure of the fluid within the fluid chamber or the fluid conduit;
a temperature sensor configured to capture data indicative of an ambient temperature; and
a computing system communicatively coupled to the position sensor, the first pressure sensor, the second pressure sensor, and the temperature sensor, wherein the computing system:
determines the current position of the residue removal device relative to the row unit frame based on the data captured by the position sensor;
determines the current first and second pressures based on the data captured by the first and second pressure sensors, respectively;
determines the current temperature of the fluid based on the data captured by the temperature sensor;
determines a current volume of the fluid chamber and the fluid conduit based on the determined position of the residue removal device; and
controls the operation of the valve based on the determined current position, the determined current volume, the determined current first and second pressures, and the determined current temperature to move the residue removal device relative to the row unit frame.

9. The agricultural implement of claim 8, wherein, when controlling the operation of the valve, the computing system controls the operation of the valve based on the determined current first pressure, the determined current second pressure, the determined current temperature, a geometric flow parameter, the determined position, and the determined current volume to move the residue removal device relative to the row unit frame.

10. The agricultural implement of claim 9, wherein, when controlling the operation of the valve, the computing system further:
   determines a valve opening duration to adjust the second pressure within the fluid chamber or the fluid conduit from the determined current second pressure to another second pressure based on the determined current volume, the determined current position, the determined current first pressure, the determined current second pressure, the determined current temperature of the fluid, and the geometric flow parameter; and
   controls the operation of the valve such that the valve is opened across the determined valve opening duration to move the residue removal device relative to the row unit frame.

11. A method for adjusting actuator pressure on an agricultural implement, the agricultural implement including a frame, a tool adjustably coupled to the frame, a fluid-driven actuator configured to adjust a position of a tool relative to the frame, the fluid-driven actuator defining a fluid chamber, the agricultural implement further including a valve configured to control a flow of a fluid to the fluid-driven actuator and a fluid conduit fluidly coupled between the valve and the fluid chamber, the method comprising:
   receiving, with a computing system, position sensor data indicative of a current position of the tool relative to the frame;
   receiving, with the computing system, first pressure sensor data indicative of a current first pressure of the fluid supplied to the valve;
   receiving, with the computing system, second pressure sensor data indicative of a current second pressure of the fluid within the fluid chamber or the fluid conduit;
   receiving, with the computing system, temperature sensor data indicative of an ambient temperature;
   determining, with the computing system, the current position of the tool relative to the implement frame based on the received position sensor data;
   determining, with the computing system, the current first and second pressures based on the received first and second pressure sensor data respectively;
   determining, with the computing system, the current temperature of the fluid based on the received temperature sensor data;
   determining, with the computing system, a current volume of the fluid chamber and the fluid conduit based on the determined current position of the tool; and
   controlling, with computing system, the operation of the valve based on the determined current volume, the determined current first and second pressures, and the determined current temperature.

12. The method of claim 11, wherein controlling the operation of the valve comprises controlling, with the computing system, the operation of the valve based on the determined current position, the determined current volume, the determined current first and second pressures, and the determined current temperature.

13. The method of claim 12, wherein controlling the operation of the valve further comprises:
   determining, with the computing system, a valve opening duration to adjust the second pressure within the fluid chamber or the fluid conduit from the determined current second pressure to another second pressure based on the determined current volume, the determined current first and second pressures, the determined current temperature, and the determined current position; and
   controlling, with computing system, the operation of the valve such that the valve is opened across the determined valve opening duration.

14. The method of claim 11, wherein controlling the operation of the valve further comprises controlling, with computing system, the operation of the valve such that the valve is opened continuously across the determined valve opening duration such that the second pressure is adjusted from the determined current second pressure to the other second pressure.

15. The method of claim 11, wherein controlling the operation of the valve comprises controlling, with the computing system, the operation of the valve based on both a geometric flow parameter, the determined current volume, the determined current first and second pressures, and the determined current temperature.

16. The method of claim 11, wherein the fluid comprises air.

* * * * *